Aug. 26, 1958 K. R. MATZ 2,849,631

ELECTRICALLY CONDUCTIVE CEMENT AND BRUSH SHUNT CONNECTION CONTAINING THE SAME

Filed April 19, 1957

INVENTOR
KENNETH R. MATZ
BY John F. Holmann
ATTORNEY

United States Patent Office 2,849,631
Patented Aug. 26, 1958

2,849,631

ELECTRICALLY CONDUCTIVE CEMENT AND BRUSH SHUNT CONNECTION CONTAINING THE SAME

Kenneth R. Matz, Cleveland, Ohio, assignor to Union Carbide Corporation, a corporation of New York Application April 19, 1957, Serial No. 653,765
17 Claims. (Cl. 310—249)

The invention relates to an electrically conductive cement which is particularly well suited for use in making a low resistance connection between a flexible electrical conductor and a solid carbonaceous body. A typical example of such a use is the connection of a wire to a brush for an electrical machine, and for conciseness the invention will be described with particular reference to such use.

Although there have been many suggestions in the art of means of securing a flexible wire (often referred to as a "shunt" or "pigtail") to a carbonaceous brush, basically there are but two important types of connection. In one of such types the wire is held in place in a hole in the brush, by a plug of tamped metal powder or amalgam, usually copper or copper amalgam. In the other general type, the wire is held in place by a bolt or a rivet passing through the brush, its head holding the wire in tight contact with the body of the brush. While both types of connection have been in commercial use for many years they suffer from inherent disadvantages which under severe operating conditions may lead to failure of the connection. Moreover, the contact resistance of the connections is relatively high.

It is the principal object of the present invention to provide a non-running electrically conductive cement having good extrusion characteristics and which, when used to join a flexible conductor to a solid body, provides a mechanically strong joint of low contact resistance.

This object is attained by the invention which comprises an electrically conductive cement consisting of silver flakes and a thermosetting resin binder. The cement as applied is of a pasty consistency, but when cured is hard and dense.

Figure 1:
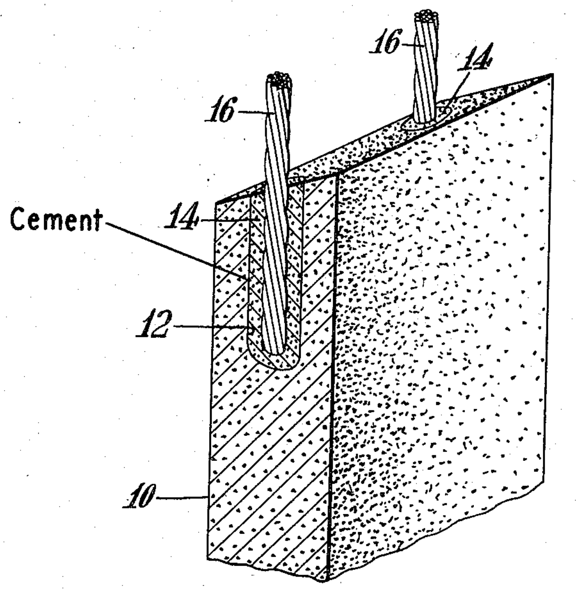
Figure 2:
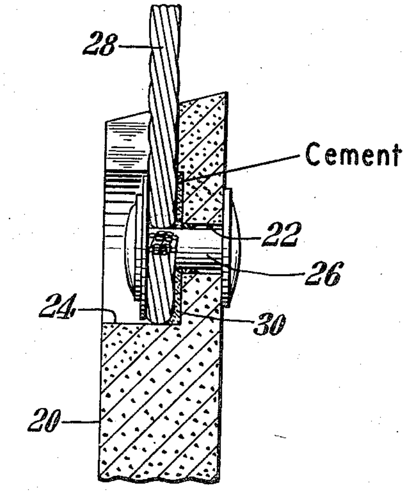

In the accompanying drawing:

Fig. 1 is an elevational view, partially in section, of one type of wire-to-brush connection embodying the invention; and Fig. 2 is a similar view of another type of connection embodying the invention.

The cement of the invention generally contains about 40 percent to 75 percent by weight of silver flakes, but for use in unthreaded joints the silver content generally should not exceed about 60 percent. A preferred range of proportions is 47 percent to 53 percent silver. The silver particles are in the form of flakes, the largest dimension of which should not exceed 65 microns. Preferably flakes not larger than 10 microns are used, and for best results the flake size should average 1 to 3 microns. As the binder in the cement a resin which is stable, that is, does not decompose or "coke out" at elevated temperatures up to about 250° C., is satisfactory. Preferably the viscosity of the resin should be between 8000 and 12,000 centipoises at room temperature. Thermosetting resins of the phenol-aldehyde type are entirely satisfactory. Other types of thermosetting resins which may be used include the epoxy resins, the urea-formaldehyde resins, and the melamine-aldehyde resins. Suitably the cement of the invention may contain an alkaline thermoset catalyst such as triethanolamine, and a chemically inert, finely divided quartz filler material. One such such filler material is "Silex," a product of the Eureka Flint and Spar Company, Gore, Virginia. The thus-modified cement formulation ranges from 30 percent to 60 percent by weight of silver flakes, 4 percent to 12 percent by weight of filler, up to 20 percent by weight of an alkaline catalyst, the balance being a thermosetting resin.

As indicated above, the cement of the invention is of a pasty consistency as applied and is "cured," that is, caused to set up by heating. The heat treatment required, of course, is determined in part by the nature of the binder, and in part by the nature of the articles to which the cement is applied. For instance, if the cement is used to connect a copper wire to a brush, the wire would suffer detrimental oxidation if heated in air at a high temperature for prolonged periods of time. For the latter reasons it is preferred that the heating be accomplished by high frequency induction methods. When a conventional phenol-formaldehyde resin is used as the binder, curing may be accomplished in a matter of seconds by this means, whereas oven-curing of this type of resin may require a much longer time. For instance, one oven-curing treatment requires heating at 150° C. for about two hours.

Referring to the drawing, there is illustrated in Fig. 1 the application of the cement of the invention to one type of embedded wire-to-brush connection known as a "Q" type connection. A brush body 10 of carbonaceous material is provided with a recess 12 into which is cemented, by a layer 14 of the cement of the invention, a flexible wire conductor 16. This type of joint is made simply by placing a quantity of cement in the recess of the brush body, inserting the wire and forcing it into the cement so as to displace it and cause it to fill the space between the wire and the walls of the recess. The cement is then cured by heating as described above.

Fig. 2 illustrates the application of the cement of the invention to another type of wire-to-brush connection. In this case case a brush body 20 has a hole 22 passing through it with a counterbore 24 in one face. A rivet 26 passes through the hole 22, its head occupying the counterbore 24 and securing the end of a flexible wire conductor 28 in the counterbore 24. A layer 30 of the cement of the invention extending under the rivet head and at least partly through the hole 22 provides a strong bond between the conductor 28 and the brush body 20 and lowers the contact resistance of the connection. This type of connection is made by preparing the rivet hole and counterbore in the brush body providing a quantity of cement in the counterbore, and then inserting the rivet and fixing it in position in conventional manner. The cement fills any surface irregularities and, when cured firmly bonds the assembly.

The specific resistance of the cement compositions embodying the invention and the joint resistance of joints formed by cementing two blocks of carbon together with cements were measured in one series of tests. In these tests, two different binders were used, and the proportion of silver was varied. For determining specific resistance, 9⁄16 inch cubes of cement were prepared by casting the cement in suitable molds. One binder used (identified as "A" in Table I below) was a mixture of phenol-formaldehyde resin, 3 parts of a resin known as "Bakelite BR–0014" being mixed with two parts of a resin identified as "Bakelite BR–7095." The other binder (identified as "B" in Table I) was an epoxy resin of the type disclosed in Bender et al., U. S. Patent No. 2,506,486. The binder was mixed in each case with the proportions of silver indicated in Table I. The cement was oven-cured by heating 16 hours at 90° C. followed by 2 hours at 150°

C., this slow curing being utilized to minimize "stewing" of the binder. The voltage drop across a ⅜ inch span was measured and specific resistance calculated from the following equation, a current of 10 amperes being used in the tests:

$$\text{Specific resistance}=\frac{\text{Voltage}\times\text{cross sectional area}}{\text{Amperes}\times\text{Span}}$$

For measuring joint resistance two carbon blocks were cut and joined by the cement of the invention and a current of 10 amperes was passed through the joined blocks. By measuring the resistance of given spans of the carbon and subtracting it from the resistance of a given span across the joint, the resistance of the joint was determined.

*Table I*

| Percent silver | Binder | Specific resistance, ohm-inch | Joint resistance, ohm |
|---|---|---|---|
| 50 | A | 0.00074 | 0.00324 |
| 50 | B | 0.00067 | 0.00894 |
| 55 | A | 0.00059 | 0.00127 |
| 55 | B | 0.00053 | 0.00626 |
| 60 | A | 0.00028 | 0.00350 |
| 60 | B | 0.00043 | 0.00312 |
| 65 | A | 0.00021 | 0.00120 |
| 65 | B | 0.00030 | 0.00262 |
| 70 | A | 0.00014 | 0.00150 |
| 70 | B | 0.00022 | 0.00208 |

Many tests have been made of brush connections made with the cement of the invention. For example, Table II sets forth the specific resistance and connection resistance of brush connections of the type illustrated in Fig. 1 using cements of different proportions of silver with a phenolic resin binder.

*Table II*

| Percent silver | Specific resistance, ohm-inch | Joint resistance, ohm |
|---|---|---|
| 40 | 0.00175 | 0.000354 |
| 50 | 0.00148 | 0.000132 |
| 60 | 0.00150 | 0.000083 |

Similar tests of connections made with a cement composed of about 50 percent silver particles and 50 percent of a phenol-formaldehyde resin known to the trade as "Bakelite BC-6035" showed the joint resistance of joints of the type illustrated in Fig. 1 (no rivet) to be 0.00004 to 0.00015 ohm as compared to an initial resistance of commercial copper amalgam joints to be 0.0002 to 0.0008 ohm—about 20 times as great. In joints of the riveted type (Fig. 2 of the drawing) those made utilizing the cement of the invention have a resistance of about 0.0006 to 0.0012 ohm as compared to the resistance of commercial joints of this type of 0.0015 to 0.0030 ohm—again about 20 times as great.

Cemented Q connections were made from the following cement formulations:

(1) 60 percent silver flakes, 36 percent "Bakelite 18794" epoxy resin, 4 percent triethanolamine (2) 60 percent silver flakes, 32.4 percent "Bakelite 18794" epoxy resin, 3.6 percent triethanolamine, 4 percent Silex (3) 60 percent silver flakes, 28.8 percent "Bakelite 18794" epoxy resin, 3.2 percent triethanolamine, 8 percent Silex (4) 60 percent silver flakes, 25.2 percent "Bakelite 18794" epoxy resin, 2.8 percent triethanolamine, and 12 percent Silex.

The connections were oven cured for four hours at 110° C. After the initial connection resistance had been taken, the connections were heat tested at 200° C. for 200 hours, resistance of the connections being measured at the end of 24, 48 and 200 hours. The average initial resistance of the connections made with each of the formulations were approximately the same. As shown in Table III, resistance of the connections made with each of the first three formulations rose rapidly within 24 hours, however, the rise in resistance of the connections made with cement containing 8 percent Silex was only approximately one-half of that of the connections made with the other two cements.

*Table III.—Initial connection resistance* ($\times 10^{-5}$ *ohms*)

| | Cement with no "Silex" | | Cement with 4% "Silex" | | Cement with 8% "Silex" | |
|---|---|---|---|---|---|---|
| | Average | Range | Average | Range | Average | Range |
| Cure, 4 hours, at 110° C. | 2.60 | 2.2- 3.6 | 3.44 | 2.2- 6.6 | 2.77 | 1.8- 4.6 |
| After 24 hours cure at 200 C. | 13.04 | 7.1-30.0 | 13.82 | 7.6-20.0 | 7.18 | 4.2-13.0 |
| After 48 hours cure at 200° C. | 18.42 | 9.4-36.0 | 17.41 | 7.4-34.0 | 8.12 | 5.0-11.6 |
| After 200 hours cure at 200° C. | 17.93 | 9.4-32.0 | 8.00 | 3.8-13.6 | 5.12 | 3.8- 9.4 |

Not only does the cement of the invention make possible the production of connections of extremely low resistance, but the joints are thermally stable. In use under adverse conditions such as overload, high temperatures, high altitudes and like conditions which cause brush temperatures to rise, conventional connections may fail quickly. For instance, copper amalgam connections lose their mercury if exposed to temperatures above 95° C. for prolonged periods of time, leading to failure of the connection. Connections made with the cement of this invention have withstood temperatures of 150° C. indefinitely and are capable of withstanding temperatures as high as 250° C. for as along as 300 hours. Thus sudden overloading of a brush having a connection embodying the cement of the invention will not cause failure in the connection. In actual tests repetitive overloads so great that the brushes glowed (about 700° C.) caused no damage to cemented connections whereas a conventional connection is destroyed by one such overload.

The physical strength of connections embodying the cement of the invention is also greatly improved over conventional connections. For example, connections embodying the cement of the invention when tested for vibration resistance in accordance with U. S. Navy Standard Specification 17B8 withstood 12 million vibrations before failure, whereas conventional connections failed in about 4 million vibrations.

In addition to these laboratory tests actual service tests of rivet-type brush connections embodying the invention have demonstrated the improvement attained by the invention. In mine locomotives standard commercial brushes having this type of connection failed in 3 to 7 days, whereas identical brushes having the same type of connection except for a layer of the cement of the invention placed as shown in Fig. 2 lasted 84 days before removal was necessary.

Although the cement of the invention has been described with reference to a particular use, it will be apparent that it is not limited in its application to such use. For instance, it may be used for connecting conductors to electrolytic electrodes. It is not necessary that either of two elements joined by the cement be carbon, for it is adhesive to metal as well as to carbon.

This application is in part a continuation of my previous application Serial No. 324,069, filed December 4, 1952.

What is claimed is:

1. An elecrically conductive cement comprising 40 percent to 75 percent of finely-divided silver flake particles, the largest dimension of which does not exceed 65 microns, and a thermosetting resin binder.

2. An electrically conductive cement comprising 40 percent to 60 percent of finely-divided silver flake particles, the largest dimension of which does not exceed 65 microns, and a thermosetting resin binder.

3. An electrically conductive cement comprising 47 percent to 53 percent of finely-divided silver flake particles, the largest dimension of which does not exceed 65 microns, and a thermosetting resin binder.

4. An electrically conductive cement comprising 40 percent to 75 percent of finely-divided silver flakes, the largest dimension of which does not exceed 10 microns, and a thermosetting resin binder.

5. An electrically conductive cement comprising 40 percent to 60 percent of finely-divided silver flakes, the largest dimension of which does not exceed 10 microns, and a thermosetting resin binder.

6. An electrically conductive cement comprising 47 percent to 53 percent of finely-divided silver flakes, the largest dimension of which does not exceed 10 microns, and a thermosetting resin binder.

7. An electrically conductive cement compriisng 47 percent to 53 percent of silver flakes of an average size of 1 to 3 microns and a phenol-formaldehyde thermosetting resin binder.

8. A rigid body having a cavity therein, and in said cavity a conductor of electricity secqured therein by an electrically conductive cement comprising 40 percent to 75 percent of silver flake particles, the largest dimension of which does not exceed 65 microns, the remainder of said cement being a thermosetting resin.

9. A rigid body having a cavity therein, and in said cavity a conductor of electricity secured therein by an electrically conductive cement comprising 40 percent to 60 percent of silver flake particles, the largest dimension of which does not exceed 65 microns, the remainder of said cement being a thermosetting resin.

10. A rigid body having a cavity therein, and in said cavity a conductor of electricity secured therein by an electrically conductive cement comprising 47 percent to 53 percent of silver in the form of flake particles, the largest dimension of which does not exceed 65 microns, the remainder of said cement being a thermosetting resin.

11. A rigid body having a cavity therein, and in said cavity a flexible conductor of electricity secured therein by an electrically conductive cement comprising 40 percent to 75 percent of an aggregate of flake particles of silver, the largest dimension of said particles being not more than 10 microns, the remainder of said cement being a thermosetting resin of the phenol-formaldehyde type.

12. An embedded shunt connection for electrical brushes and contacts having a cavity therein, and in said cavity a flexible conductor of electricity secured therein by an electrically conductive cement comprising 40 percent to 75 percent of an aggregate of flake silver particles, said particles having a dimension not exceeding 10 microns, the remainder of said cement consisting of a thermosetting resin.

13. An embedded shunt connection for electrical brushes and contacts having a cavity therein, and in said cavity a flexible conductor of electricity secured therein by an electrically conductive cement comprising 40 percent to 75 percent of an aggregate of flake silver particles, said particles having a dimension not exceeding 10 microns, the remainder of said cement consisting of a thermosetting resin of the epoxide type.

14. An embedded shunt connection for electrical brushes and contacts having a cavity therein, and in said cavity a flexible conductor of electricity secured therein by an electrically conductive cement comprising 40 percent to 75 percent of an aggregate of flake silver particles, said particles having a dimension not exceeding 10 microns, the remainder of said cement consisting of a thermosetting resin of the melamine-aldehyde type.

15. An electrically conductive cement consisting of 30 percent to 60 percent by weight of silver flake particles, the largest dimension of which does not exceed 65 microns, 4 percent to 12 percent by weight of a finely divided quartz filler, up to 20 percent by weight of an alkaline thermoset catalyst, the balance being a thermosetting resin selected from the group consisting of the epoxy resins, the phenolic resins, the urea-formaldehyde resins, and the melamine-aldehyde resins.

16. An embedded shunt connection for electrical brushes and contacts having a cavity therein and in said cavity a flexible conductor of electricity secured therein by a conductive cement consisting of 60 percent by weight of silver flakes, the largest dimesion of which does not exceed 65 microns, from 25.2 percent to 36 percent by weight of an epoxy resin, 4 percent to 12 percent by weight of finely divided quartz filler material and from 2.8 percent to 4 percent by weight of tirethanolamine.

17. A rigid body having a cavity therein and in said cavity a flexible conductor of electricity secured therein by a conductive cement consisting of 60 percent by weight of silver flakes, the largest dimension of which does not exceed 65 microns, from 25.2 percent to 36 percent by weight of an epoxy resin, 4 percent to 12 percent by weight of finely divided quartz filler material and from 2.8 percent to 4 percent by weight of triethanolamine.

References Cited in the file of this patent

UNITED STATES PATENTS

| | | |
|---|---|---|
| 1,453,793 | Hamister | May 1, 1923 |
| 2,397,744 | Kertesz | Apr. 2, 1946 |
| 2,444,034 | Hixon | June 29, 1948 |
| 2,470,352 | Holmes | May 17, 1949 |
| 2,473,884 | Hein | June 21, 1949 |
| 2,509,909 | Davis | May 30, 1950 |
| 2,631,252 | Falceton | Mar. 10, 1953 |
| 2,654,038 | Veley | Sept. 29, 1953 |

FOREIGN PATENTS

| | | |
|---|---|---|
| 246,716 | Great Britain | Feb. 4, 1926 |
| 566,492 | Great Britain | Jan. 2, 1945 |

OTHER REFERENCES

"Handbook of Chemistry and Physics," 30th ed., 1947, published by Chemical Rubber Publishing Co., p. 1952.